United States Patent [19]
Aylott

[11] 3,896,698
[45] July 29, 1975

[54] QUICK RELEASE FASTENER
[75] Inventor: John F. Aylott, Camberley, England
[73] Assignee: Dzus Fastener Co. Inc., West Islip, N.Y.
[22] Filed: June 13, 1974
[21] Appl. No.: 478,834

[30] Foreign Application Priority Data
June 29, 1973 United Kingdom.............. 31116/73

[52] U.S. Cl........................................ 85/7; 24/217
[51] Int. Cl.² ................... F16B 19/00; F16B 21/00
[58] Field of Search ............ 85/7, 8.8, 5 R; 24/216, 24/217, 208 A, 211 M, 211 L; 151/69

[56] References Cited
UNITED STATES PATENTS

| 2,252,286 | 8/1941 | Hathorn............................. 85/8.8 X |
| 2,442,398 | 6/1948 | Chandler ................................... 85/7 |
| 3,112,547 | 12/1963 | Poe ................................. 85/5 R X |
| 3,181,899 | 5/1965 | McKnight ......................... 85/5 R X |
| 3,594,875 | 7/1971 | Sanow.................................... 24/214 |
| 3,694,013 | 9/1972 | Heitner............................. 151/69 X |

Primary Examiner—Ramon S. Britts

[57] ABSTRACT

This invention concerns a Quick Release Fastener of the kind which is arranged releasably to connect together two members, such as panels, and which comprises a stud assembly extending through an opening in one of the members and a complementary receptacle carried by the other of the members. The stud assembly includes an enlarged tail part which is arranged, in use, to pass between leaf spring elements of the receptacle, said leaf spring elements retaining the stud assembly in the receptacle. The fastener is both coupled and released by axial movement of the stud part to allow the enlarged tail part to pass between the leaf spring elements.

3 Claims, 4 Drawing Figures

QUICK RELEASE FASTENER

This invention is concerned with a quick-release fastener of the kind which is arranged releasably to connect two members, such as panels, and which comprises a stud assembly arranged to extend through an opening in one of the members and a complementary receptacle carried by the other of the members.

Numerous quick-release fasteners of this general type have been produced, but there has been a need for a fastener of simple construction, and thus of low cost, which is both locked and unlocked by a simple axial movement of the stud.

In accordance with the present invention, such a fastener comprises a one-piece integrally moulded stud having a head part, an elongate shank, an abutment on the shank, and an enlarged tail part; a grommet arranged to retain the stud on its corresponding member; a compression spring element surrounding the stud shank and acting between the head of the stud and a part of the grommet, urging the stud outwards from the grommet; a resilient split cylindrical collar axially slidably mounted on the shank between the abutment and the tail part and having an external diameter at least as great as that of the tail part, the collar being split and capable of being mounted on the shank by being pushed and expanded over the tail part; and a receptacle assembly arranged to receive the stud, the receptacle having leaf spring elements extending in a generally axial direction and, in use, locating behind the tail part of the stud to fasten the two members together when the stud is pushed into the receptacle assembly compressing the spring and the tail part has passed between the elements, unlocking of the fastener being accomplished by further inwards axial movement of the stud wherein the split collar is moved by the abutment between the leaf spring elements forcing them apart and thus disengaging them from behind the tail part, release of the stud allowing the tail part to be removed under action of the spring element.

Preferably, all the parts of the fastener except the compression spring are made from a synthetic plastics material. The grommet may be elongate so that the compression spring is partially contained within the grommet. This enables the overall length of the fastener to be made as short as possible.

One example of a fastener constructed in accordance with the present invention will now be described with reference to the accompanying drawings, in which.

Figure 1:
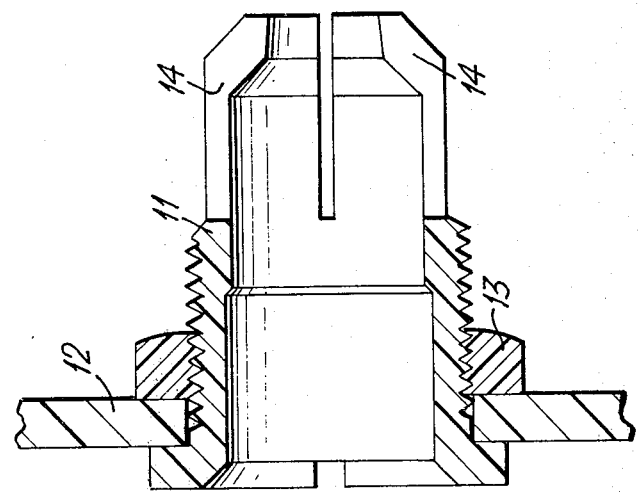
FIG. 1 shows an exploded sectional view of the two halves of the fastener.
Figure 1:
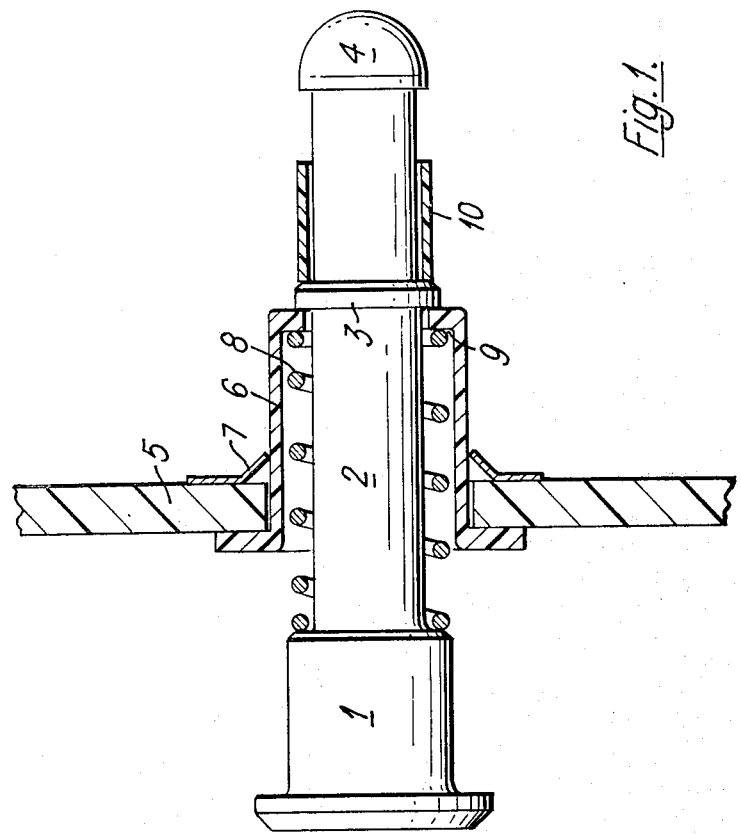

The fastener shown is made of a synthetic plastics material and has a stud with a head part 1, a reduced shank 2 which has a raised abutment shoulder 3, and a rounded tail part 4. The stud part is associated with a first member 5 and is held in position in an aperture on this member by a grommet 6. The grommet itself is retained in the aperture in the member 5 by a metal spring retaining washer 7, and by this means panels of various thicknesses may be accommodated. A metal compression spring 8 acts between the end 9 of the grommet and the head 1 of the stud, the spring biasing the stud towards the left as seen in FIG. 1. The stud is prevented from being withdrawn from the grommet 6 by the abutment shoulder 3.

Around the end of the shank 2 nearest the tail part 4 there is positioned a split collar 10, the purpose of which will be explained later on.

The receptacle assembly of the fastener consists of a cylindrical part 11 which is externally threaded and which projects through the second panel or member 12. A plastic nut 13 is screwed onto the thread in order to retain the receptacle assembly on the second member. The receptacle assembly has leaf spring elements 14 which, in use, are located behind the tail part 4 of the stud to retain the stud within the receptacle.

Figure 3:
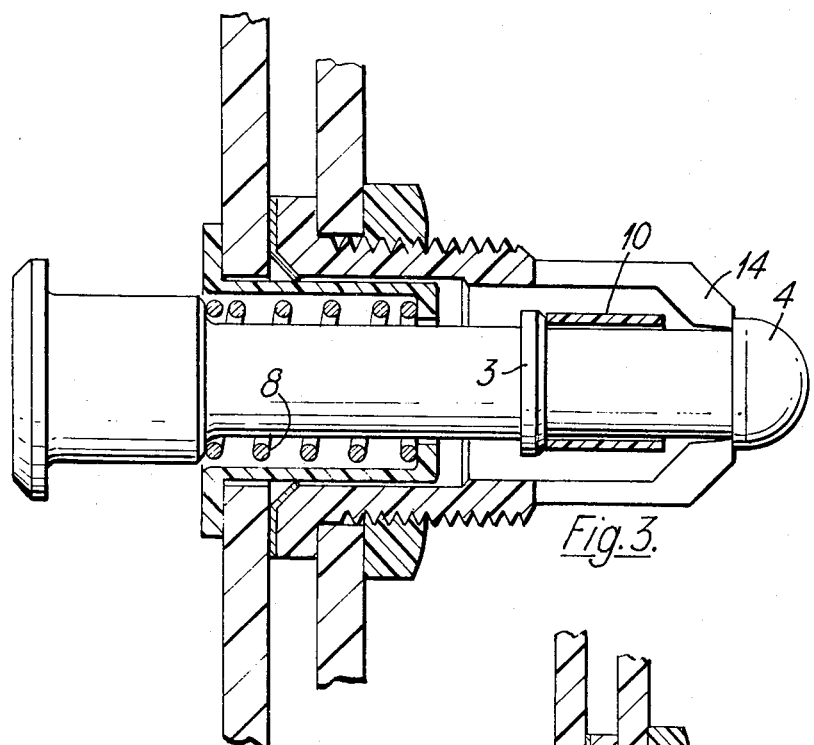
FIGS. 2 to 4 show the sequence of positions which take place during fastening and unfastening.
Figure 4:
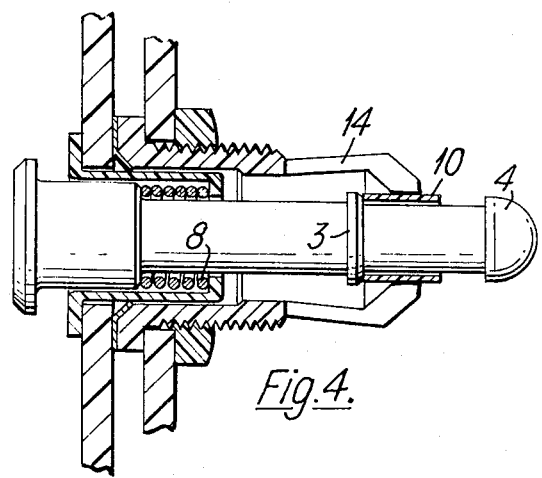
Figure 2:
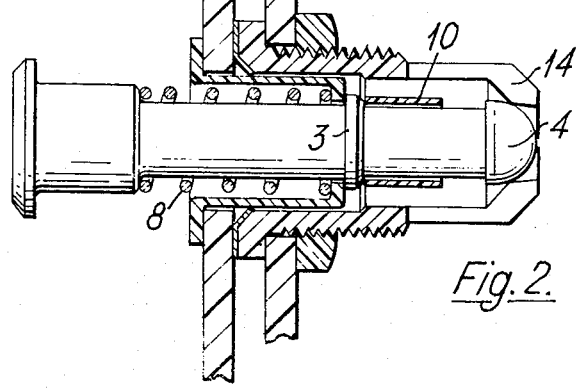

The steps of fastening and unfastening the two halves of the fastener are shown in FIGS. 2, 3 and 4. In FIG. 2 the stud is shown loosely inserted in the receptacle with its rounded tail part 4 resting against the inner walls of the leaf spring elements 14. In this position the panels are unfastened.

To fasten the panels together pressure is applied to the head 1 of the stud forcing the rounded tail part 4 between the spring elements 14 which are thus caused to move outwards to allow the tail part 4 to pass between them. The split collar 10, being a loose fit on the shank 2 is gently held by the inner edges of the spring elements 14 and is prevented from passing through them since there is no force pushing it. As the tail part 4 passes between the leaf spring elements 14 their resilience snaps them back into position along the stud shank 2. The two panels are now firmly fastened together as shown in FIG. 3.

To disengage the two panels all that is necessary is for the stud to be pushed further, against the action of the helical spring 8, into the receptacle so that the collar 10 is pushed by the abutment shoulder 3 between the leaf spring elements 14 as shown in FIG. 4. The pushing force is now released and, under the action of the spring 8, the tail part 4 retracts until it abuts the collar 10 which is held in place by friction forces between the leaf spring elements 14. At this point the spring force of the spring 8 is transmitted to the collar 10 and the collar begins to move out from between the elements 14, overcoming the friction forces. Since the collar 10 and tail part 4 are of the same diameter the tail part 4 does not catch on the elements 14 and it too is withdrawn between the leaf springs 14. The fastener now reverts to a position similar to that of FIG. 2 and the stud may be withdrawn from the receptacle. The panels are thus uncoupled.

We claim:

1. A quick release fastener useful in releasably connecting two members together which comprises:

a fastener receptacle provided with a base portion for mounting it on one of said members and having an aperture extending therethrough with a tubular cluster of leaf springs surrounding the aperture and projecting outwardly from the base portion and terminating in an inwardly turned end portion with an inner camming surface and an outer locking edge;

a fastener stud assembly including means for mounting it on the other of said members with a stud carried by said mounting means for axial reciprocation and formed with an operating head and a shank portion projecting therefrom for engagement between the tubular cluster of leaf springs in the receptacle, the shank portion terminating in an enlarged knob at the end thereof formed with a rounded camming outer surface to engage the inner camming surface of the leaf springs to spread them apart as the stud is projected into the receptacle and also with a locking shoulder on the inner edge of the knob for engagement with the locking edge of the leaf springs after the knob has been projected therethrough, the shank portion also having a flange projecting outwardly therefrom located between the head of the stud and the knob; and, a collar slideably mounted on the shank between the flange and knob and being shorter in length than the distance between the knob and flange so that it can slide with respect thereto, the outside diameter of such collar being at least approximately as great as the diameter of such knob so that when the knob is locked beyond the locking edge of the leaf springs and the stud is projected further inwardly to cause the flange to shift the collar to a position between the inwardly turned end portions of the leaf springs, the knob is released from engagement with the locking edge of the leaf springs to permit withdrawal of the fastener stud from the receptacle.

2. A quick release fastener as set forth in claim 1 in which spring means are provided between the stud and the mounting means to normally urge the stud axially in a direction towards the head portion.

3. A quick release fastener as set forth in claim 1 in which the stud is molded in one piece of plastic material.

* * * * *